United States Patent [19]
Misterka et al.

[11] Patent Number: 5,381,894
[45] Date of Patent: Jan. 17, 1995

[54] STORAGE CASE FOR MULTIPLE COMPACT DISCS AND RELATED PRINTED MATERIAL

[75] Inventors: Joseph J. Misterka, Terre Haute, Ind.; John W. Carroll, III, Pepperal, Mass.

[73] Assignee: Digital Audio Disc Corporation, Terre Haute, Ind.

[21] Appl. No.: 195,349

[22] Filed: Feb. 10, 1994

Related U.S. Application Data

[63] Continuation-in-part of Ser. No. 61,009, May 14, 1993, Pat. No. 5,285,893.

[51] Int. Cl.$^6$ .............................................. B65D 85/57
[52] U.S. Cl. .................................. 206/310; 206/311; 206/313
[58] Field of Search ............... 206/310, 311, 312, 313, 206/232

[56] References Cited

U.S. PATENT DOCUMENTS

| | | | |
|---|---|---|---|
| 4,084,690 | 4/1978 | Pulse | 206/310 |
| 4,327,831 | 5/1982 | Inaba et al. | 206/310 |
| 4,535,888 | 8/1985 | Nusselder | 206/311 X |
| 4,709,812 | 12/1987 | Kosterka | 206/310 |
| 4,771,883 | 9/1988 | Herr et al. | 206/313 |
| 4,874,085 | 10/1989 | Grobecker et al. | 206/310 X |
| 5,147,036 | 9/1992 | Jacobs | 206/313 |
| 5,269,409 | 12/1993 | Brandt et al. | 206/310 X |
| 5,285,893 | 2/1994 | Misterka et al. | 206/310 |
| 5,310,054 | 5/1994 | Stumpff et al. | 206/310 |

FOREIGN PATENT DOCUMENTS

| | | | |
|---|---|---|---|
| 420350 | 4/1991 | European Pat. Off. | 206/310 |
| 940214 | 5/1948 | France | 206/311 |
| 21009 | of 1907 | United Kingdom | 206/313 |
| WO92/15505 | 9/1992 | WIPO | 206/310 |

Primary Examiner—William I. Price
Attorney, Agent, or Firm—William S. Frommer; Alvin Sinderbrand

[57] ABSTRACT

A storage case for accommodating a plurality of compact discs includes lid and bottom members having similar rectangular panels and pairs of opposed peripheral walls extending along the short and long sides, respectively, of the respective panels, with the lid and bottom members being pivotally connected for relative movements about an axis parallel to adjacent long sides of the panels between a closed position in which the panels are in parallel spaced relation and the pairs of peripheral walls interfit to enclose a space between the panels, and an opened position in which the panels are angularly spread apart. Trays having compact disc supporting elements thereon are mounted on the lid and bottom members so as to be disposed at interiors of the respective panels in the closed position with the disc supporting elements confronting each other, and with one of the trays being spaced from the respective panel to define a compartment therebetween for receiving a printed booklet or the like one of the trays has cutouts located adjacent both of the opposed sides of the respective panel and being substantially spaced from the relatively short sides of such panel, while the other tray has tapered protuberances located to extend into the cutouts and being dimensioned for bearing support against the booklet in the compartment in the closed position of the lid and bottom members.

4 Claims, 6 Drawing Sheets

STORAGE CASE FOR MULTIPLE COMPACT DISCS AND RELATED PRINTED MATERIAL

RELATED APPLICATION

This application is a continuation-in-part of U.S. patent application Ser. No. 08/061,009, filed May 14, 1993, and issued Feb. 15, 1994 as U.S. Pat. No. 5,285,893.

BACKGROUND OF THE INVENTION

1. Field of the Invention

This invention relates generally to cases for storing disc-shaped information carriers having high storage density, such as, optically-readable compact discs, and more particularly is directed to a storage case which can accommodate a plurality of compact discs as well as a printed pamphlet or booklet concerning information recorded on the compact disc or discs.

2. Description of the Prior Art

Compact discs have, for the most part, been displayed, sold and stored in cases or containers of the so-called "jewel-box" type. A jewel-box case generally comprises lid and bottom members of a clear or transparent plastic having similar substantially square panels, and a tray of an opaque plastic which snap-fits into the bottom member and has a centrally located compact disc holder. The lid and bottom members are hingedly connected along one-edge of the respective square panels for movement relative to each other between an angularly spread apart opened position in which a compact disc can be placed on, or removed from the holder therefor at the center of the tray, and a closed position in which the lid and bottom members enclose and protect a compact disc positioned on the holder of the tray. Printed promotional material is usually provided within the jewel-box case so as to be viewable through the clear panels of the lid and bottom members. For example, a printed sheet may be disposed between the panel of the bottom member and the tray secured therein, while a relatively thin printed pamphlet or booklet containing information relevant to the recorded contents of the respective compact disc is held against the inside of the clear panel of the lid member by tabs which project from peripheral walls of the lid member generally parallel to the panel of the latter.

The above-described jewel-box cases have provided attractive packaging for displaying, selling and storing single compact discs. However, multiple compact discs on which there are recorded related works, for example, of a particular composer or performer, are now being offered for sale in sets, and it is desired to provide cases similar to the described jewel-boxes in which such sets of compact discs can be readily displayed, sold and stored.

In one proposed arrangement for packaging a plurality of compact discs, for example, as disclosed in detail in U.S. Pat. No. 4,874,085, each compact disc is held or supported in a respective bottom portion, and two or more of such bottom portions are stacked, whereupon a cover or lid portion is applied on the uppermost bottom portion and the resulting assembly and a printed pamphlet or booklet are then wrapped in a supplementary sheet to form a packet which is slidably inserted into an outer box-like container. The foregoing arrangement is disadvantageous in that the packaged compact discs are not easily removable from the package for reproduction of the recorded music or other information, and, after such playback or reproducing is completed, the repackaging of the compact discs is burdensome.

In another proposed arrangement for packaging a plurality of compact discs, for example, as disclosed in detail in U.S. Pat. No. 4,709,812, a unitary blank of paperboard or the like is prescored along fold lines to define multiple panels which can be preprinted with graphics or the like, whereupon two or more compact disc holders of plastic material are glued on respective panels of the blank. After compact discs are disposed on the respective holders therefor, the blank is folded to a closed condition and is then inserted in a separately erected cover carton which is finally wrapped with a clear plastic film or "shrink-wrap". Although the various panels of the unitary blank provide surfaces on which suitable information can be preprinted, such surfaces are not sufficient to carry all of the explanatory printed information that may be desired in connection with a set of compact discs. Furthermore, once again, the described arrangement for packaging a plurality of compact discs is not readily opened and closed.

In yet another proposed arrangement for storing two or more compact discs or the like, for example, as described in detail in U.S. Pat. No. 4,535,888, a storage cassette is provided with a box-like center portion forming an intermediate bottom and, at the opposite sides of the latter, covers which have compact disc holders for the acceptance of respective compact discs, and which are hingedly connected to the center portion for swinging relative to the latter between opened and closed positions like covers of a book. In the closed position, the holders on the covers face toward the box-like center portion so that a compact disc on each holder is contained within a space defined by the respective cover and the box-like center portion. The center portion may also have compact disc holders therein for accepting additional compact discs, or the center portion may be employed for receiving a printed pamphlet or booklet. When the center portion has holders therein for receiving additional compact discs, the compact disc holders of the covers may be provided on respective trays which are snapped into the covers and may be removed from the latter for permitting the insertion of printed material between each tray and the respective cover. Such printed material has to be relatively thin and may comprise, at most, only a few sheets. On the other hand, if the center portion is employed for accepting a printed pamphlet or booklet, a compact disc supported on the holder of one of the covers can, in the closed position of such cover, undesirably engage the printed pamphlet or booklet in the center portion. Furthermore, the provision of two covers hingedly connected with the center portion, as described, for accommodating two compact discs is undesirably complicated in structure and assembly.

OBJECTS AND SUMMARY OF THE INVENTION

Accordingly, it is an object of this invention to provide a storage case for accommodating a plurality of compact discs as well as a relatively thick printed booklet or pamphlet, and which avoids the previously mentioned disadvantages of the prior art.

More specifically, it is an object of this invention to provide a storage case, as aforesaid, of relatively simple construction and assembly.

It is another object of this invention to provide a storage case, as aforesaid, in which the printed booklet or pamphlet can be inserted or removed without disturbing either of the compact discs held within the storage case.

A further object of the invention is to provide a storage case, as aforesaid, in which a relatively thick printed booklet or pamphlet can be contained within the storage case without the possibility of contacting such booklet or pamphlet with either of the compact discs supported within the storage case.

In accordance with an aspect of this invention, a storage case for accommodating a plurality of compact discs comprises a bottom member including a panel of rectangular configuration and a pair of opposed peripheral walls extending along relatively long sides of such panel; a lid member including a panel of substantially the same rectangular configuration as the panel of the bottom member and a pair of opposed peripheral walls extending along relatively short sides of the panel of the lid member; means pivotally connecting the lid and bottom members for movements relative to each other about an axis parallel to adjacent long sides of the respective panels between a closed position in which the panels are in parallel spaced relation with the peripheral walls of the lid member extending between adjacent ends of the peripheral walls of the bottom member for enclosing a space between the panels, and an opened position in which the panels of the lid and bottom members are angularly spaced apart; first and second trays each having disc supporting means for removably supporting a respective compact disc thereon; and means for mounting the first and second trays on the lid and bottom members, respectively, so as to be disposed at interiors of the panels in the closed position with the disc supporting means of the first and second trays in confronting relation to each other, with one of the trays being spaced from the panel of the respective one of the lid and bottom members for defining therebetween a compartment for receiving a printed booklet and to which, in the opened position, access is had between ends of the peripheral walls of that one member, that one tray having cutouts located adjacent both of the opposed long sides of the panel of that one member and being substantial spaced from the relatively short sides of the panel of that one member, while the other tray has tapered protuberances located to extend into the cutouts and being dimensioned for bearing support against a printed booklet in said compartment when said lid and bottom members are in said closed position thereof, whereby to deter bowing toward each other of said panels of said lid and bottom members.

The above, and other objects, features and advantages of the invention, will be apparent in the following detailed description of an illustrative embodiment which is to be read in connection with the accompanying drawings.

DETAILED DESCRIPTION OF A PREFERRED EMBODIMENT

Referring to the drawings in detail, and initially to FIG. 1 thereof, it will be seen that a storage case 10 according to an embodiment of the present invention generally comprises a bottom member 11 and a lid member 12 which are molded or otherwise formed of a clear or transparent plastic, and trays 13 and 14 molded of an opaque plastic and being mounted on the bottom member 11 and the lid member 12, respectively, as hereinafter described in detail.

Figure 3:
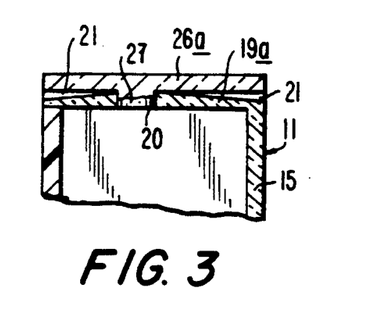
FIGS. 3, 4 and 5 are enlarged, fragmentary sectional views taken along the lines 3—3, 4—4 and 5—5, respectively, on FIG. 2.
Figure 4:
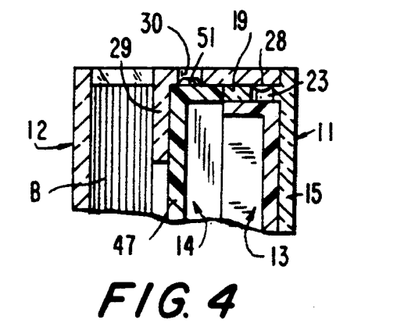
Figure 7:
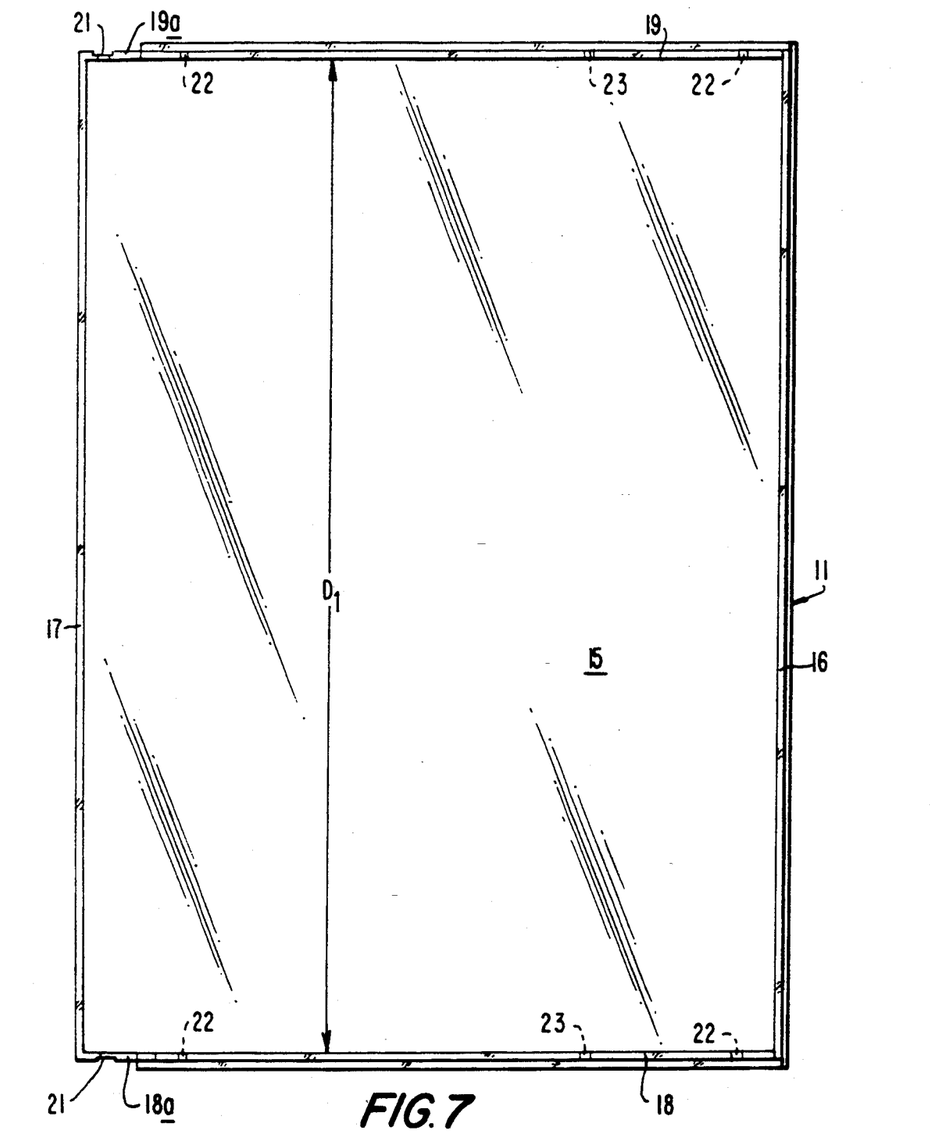
FIG. 7 is a plan view of a bottom member included in the storage case of FIG. 1.
Figure 8:
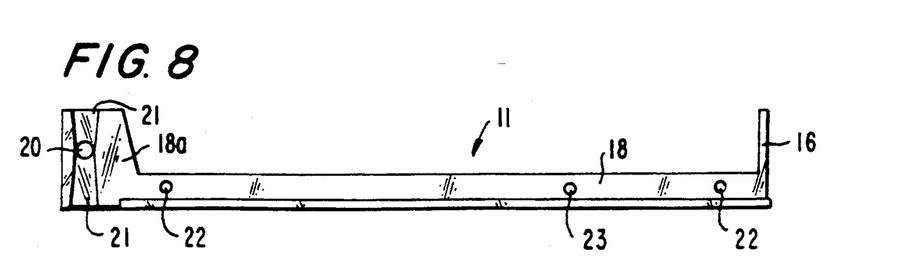
FIG. 8 is an end elevational view of the bottom member shown on FIG. 7.

As shown on FIGS. 7 and 8, the bottom member 11 includes a panel 15 of rectangular configuration having a long dimensioned $D_1$ substantially greater than the diameter of compact discs CD1 and CD2 (FIG. 1) to be accommodated in the storage case 10. Upstanding peripheral walls 16 and 17 extend along the opposed relatively long sides of the panel 15. The bottom member 11 further has relatively shallow upstanding rims 18 and 19 extending along the opposed relatively short sides of the panel 15. The rims 18 and 19 have relatively deep end portions 18a and 19a adjacent and joined to ends of the peripheral wall 17 of the bottom member 11. The relatively deep end portions 18a and 19a are formed with aligned through holes 20, and the outwardly facing surfaces of the end portions 18a and 19a of the rims have grooves 21 extending from the upper and lower edges of the deep end portions 18a and 19a to the holes 20 therein. As shown particularly on FIG. 3, the grooves 21 decrease in depth from the upper and lower edges of the respective end portions 18a and 19a of the rims to the respective holes 20 for a purpose that will be hereinafter described. Each of the relatively shallow rims 18 and 19 is further shown to have holes 22 therein (FIG. 8) which are positioned approximately equally from the peripheral wall 16 and the respective relatively deep end portion 18a or 19a. An additional hole 23 is shown to be provided in each of the rims 18 and 19 at a position between the respective holes 22 and preferably closer to the peripheral wall 16 than to the peripheral wall 17.

Figure 9:
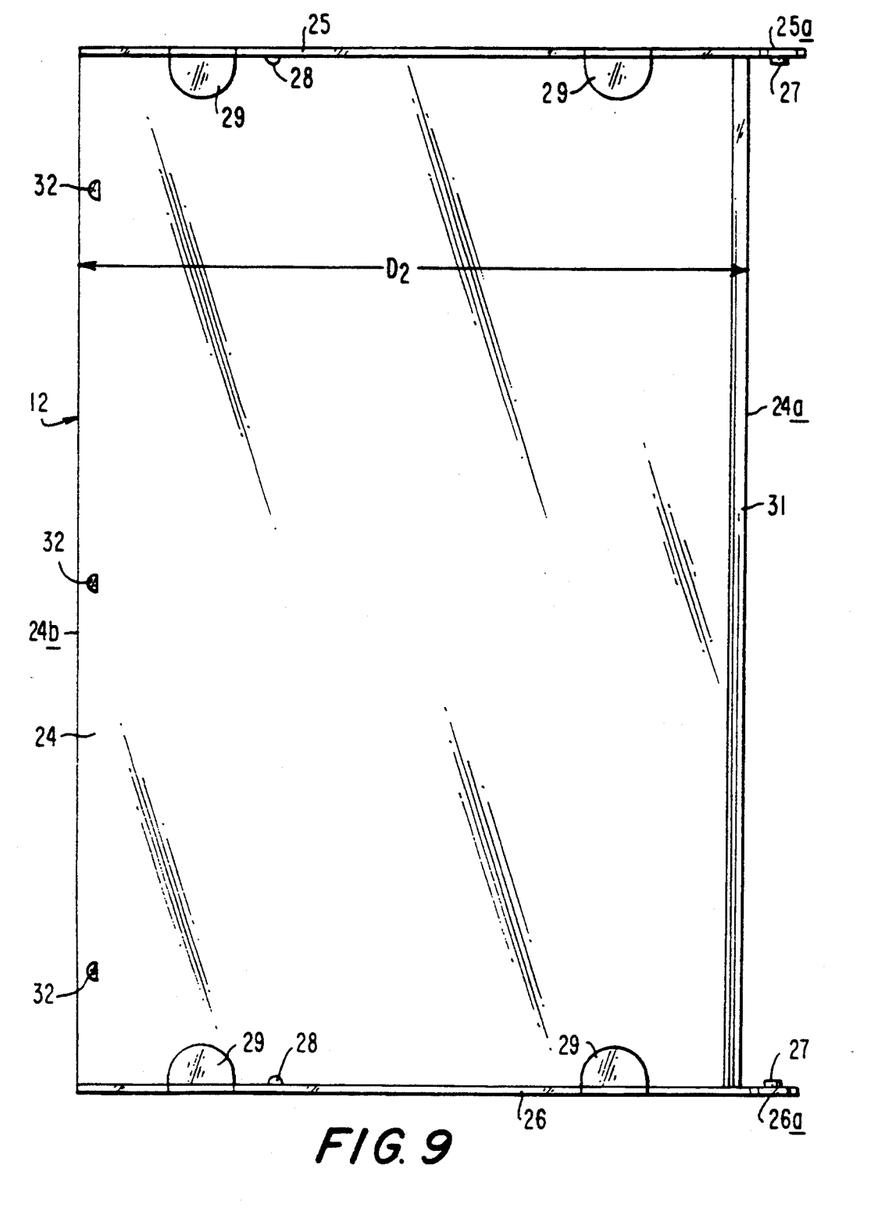
FIG. 9 is a plan view of a lid member included in the storage case of FIG. 1.
Figure 10:
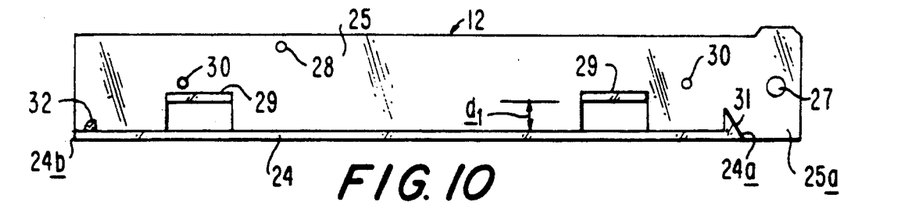
FIG. 10 is an end elevational view of the lid member shown on FIG. 9.

Referring now to FIGS. 9 and 10, it will be seen that the lid member 12 also includes a panel 24 of approximately the same rectangular configuration as the panel 15 of the bottom member 11, but having a width or relatively small dimension $D_2$ approximately equal to the distance along each of the rims 18 and 19 of the bottom member 11 measured from the respective deep end portion 18a or 19a to the peripheral wall 16 (FIG. 8). The lid member 12 further includes a pair of opposed peripheral walls 25 and 26 extending along the relatively short sides of the rectangular panel 24 of the lid member. The peripheral walls 25 and 26 are as long as the lateral distance between the peripheral walls 16 and 17 of the bottom member 11 so as to have end portions 25a and 26a, respectively, that extend beyond the long side 24a of the panel 24. Such end portions 25a and 26a are formed with pins 27 directed inwardly therefrom for engagement in the holes 20 of the bottom member 11 when pivotally connecting the bottom and lid members 11 and 12, as hereinafter described in detail. The peripheral walls 25 and 26 of the lid member 12 further have rounded pins or protuberances 28 directed inwardly therefrom at locations corresponding to the positions of the holes 23 in the rims 18 and 19 of the bottom member 11 so that, in the closed position of the lid member 12 relative to the bottom member 11 shown on FIGS. 2 and 6, the protuberances 28 engage in holes 23 to provide detents for yieldably retaining the members 11 and 12 in such closed position.

Figure 5:
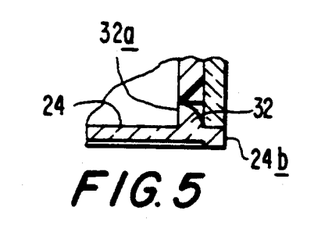

The lid member 12 is further shown to be provided with tabs 29 extending inwardly from the peripheral walls 25 and 26 and being spaced substantially from the panel 24, for example, by the distance $D_1$ on FIG. 10, for similarly spacing the tray 14 from the panel 24 of the lid member 12 when such tray 14 is mounted on the lid member, as hereinafter described in detail. The peripheral walls 25 and 26 are also formed with holes 30 (FIG. 10) at a level above the tabs 29 and which, as later described, are engaged by the tray 14 for securing the latter to the lid member 12. The lid member 12 is shown to have an abutment 31 extending between the peripheral walls 25 and 26 along the long side 24a of the panel 24 which is adjacent the pins 27 defining the pivoting axis of the lid member 12 relative to the bottom member 11. Projections 32 are spaced apart along the long side 24b of the panel 24 which is remote from the side 24a, that is, remote from the pivoting axis. As shown particularly on FIG. 5, each of the projections 32 has a sloping or curving portion facing toward the long side 24b of the panel, and each such projection 32 has a shoulder 32a at right angles to the panel 24 of the lid member and facing away from the adjacent side 24b of the panel, that is, facing in the direction toward the pivoting axis of the lid member 12 relative to the bottom member 11.

Figures 11, 12:
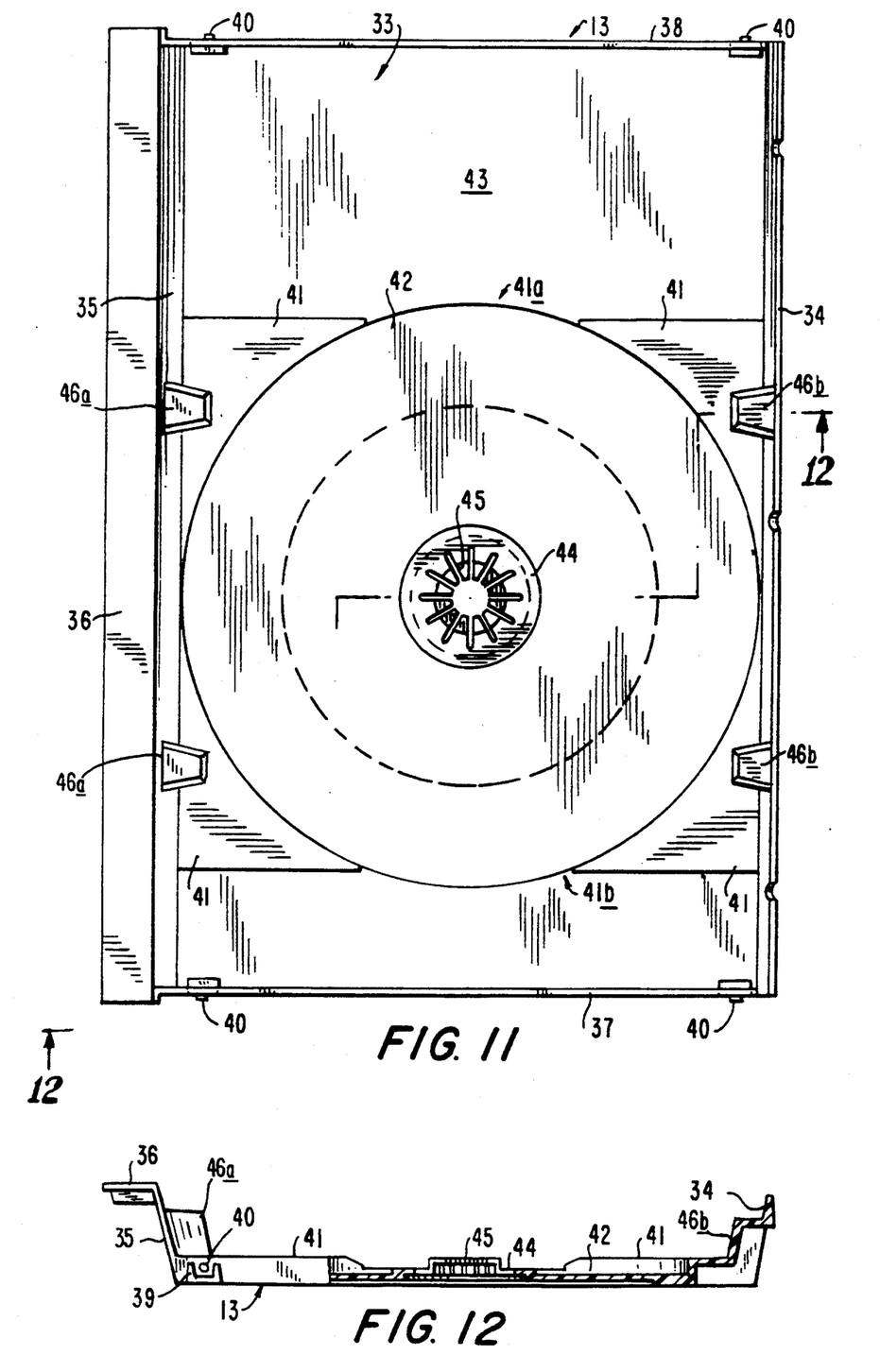
FIG. 11 is a plan view of a tray which is included in the storage case of FIG. 1, and which, in the completed storage case, is mounted on the bottom member shown in FIGS. 7 and 8.
FIG. 12 is an end elevational view, partly in section along the line 12—12 on FIG. 11, of the tray shown in FIG. 11.

Referring now to FIGS. 11 and 12, it will be seen that the tray 13 is generally rectangular to fit within the confines of the bottom member 11 defined by the peripheral walls 16 and 17 and the rims 18 and 19. More particularly, the tray 13 is molded to include a base 33 with an upstanding flange 34 along one relatively long side thereof to rest against the inner surface of the peripheral wall 16, and a sloping wall 35 extending along the opposite long side of the base 33 and leading to a horizontal shelf 36 which extends over the edge of the peripheral wall 17 when the tray 13 is mounted on the bottom member 11. Shallow upstanding flanges 37 and 38 extend along the opposed relatively short sides, respectively, of the base 33. The flanges 37 and 38 are formed, near their ends, with relieved resilient tabs 39 having pins 40 projecting outwardly therefrom (FIG. 12). Such pins 40 are located so that, when the tray 13 is disposed on the bottom member 11, the pins 40 are resiliently engageable in the holes 22 of the rims 18 and 19 for securing the tray 13 on the bottom member 11. The base 33 of the tray 13 is further shown to have raised portions 41 encircling a circular indentation 42 which is dimensioned to loosely receive a respective compact disc. It will be seen on FIG. 11 that the circular indentation 42 is substantially closer to the flange 37 than to the opposed flange 38 so that there is a substantial flat area 43 of the base 33 between the indentation 42 and the flange 38.

For removably supporting a compact disc on the tray 13, the base 33 has an annular elevated seat 44 at the center of the respective indentation 42 for engagement with an information-free central area of the compact disc. A circular array of resilient segmented parts extend from within the elevated seat 44 and are engageable in the usual center hole of a compact disc disposed on the seat 44 to act as a spring catch 45 for retaining such compact disc on the seat 44. Preferably, the raised portions 41 of the base 33 are interrupted at diametrically opposed regions of the perimeter of indentation 42, as at 41a and 41b on FIG. 11, so as to facilitate manual gripping of the edge of a compact disc when engaging or disengaging the spring catch 45 with respect to the compact disc. Finally, the tray 13 is shown to have tapered protuberances 46a and 46b arising from raised portions 41 of the base 33 and merging with the adjacent peripheral walls 35 and 34, respectively, for a purpose hereinafter described in detail. The protuberances 46a and 46b, being merged with the peripheral walls 35 and 34 of the tray 13, are adjacent the opposed long sides of the panel 15 along which the peripheral walls 17 and 16 extend. Further, the protuberances 46a and 46b are spaced substantially from the flanges 37 and 38 (FIG. 11), and hence from the relatively short sides of the panel 15 when the tray 13 is assembled with the bottom member 11 (FIG. 1).

Figure 13:
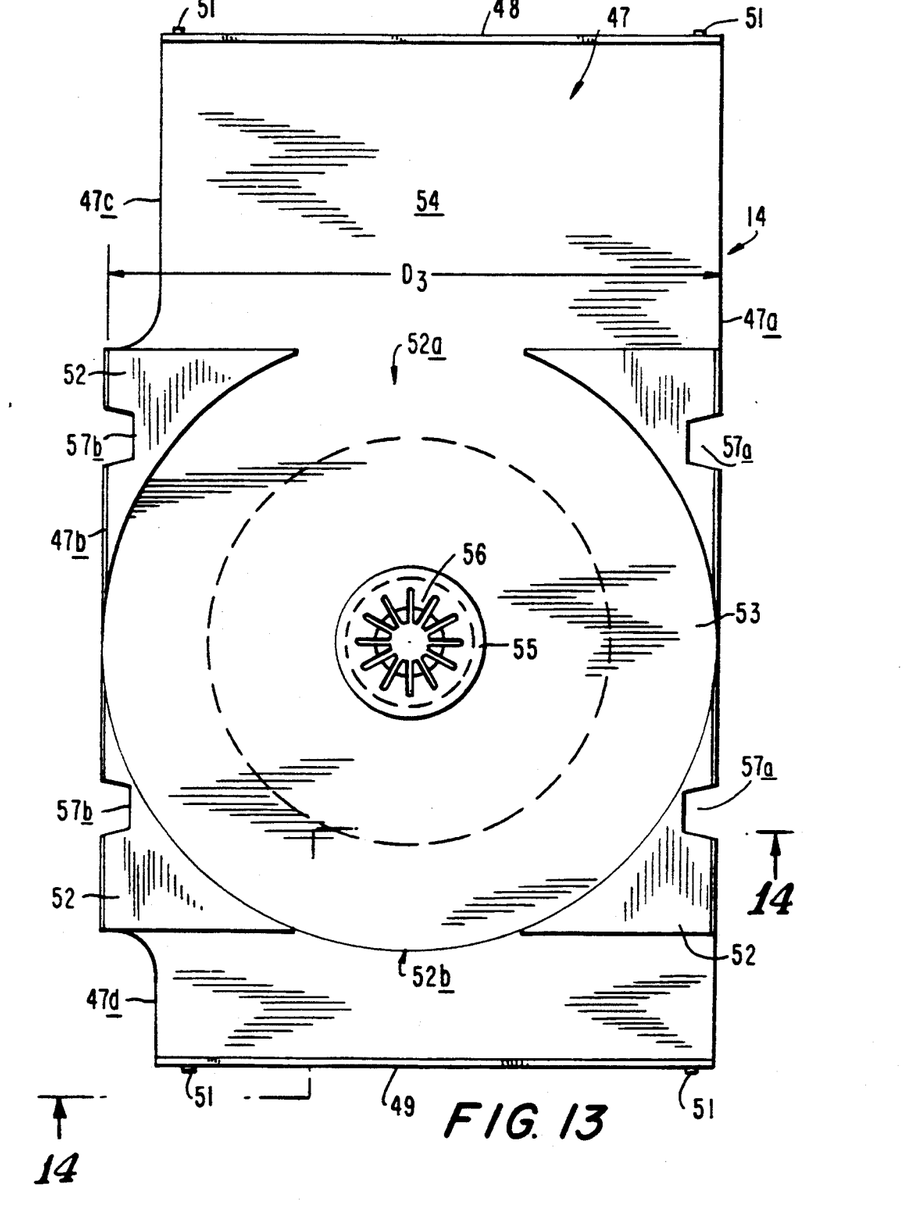
FIG. 13 is a plan view of a tray included in the storage case of FIG. 1, and which, in the completed storage case, is mounted on the lid member of FIGS. 9 and 10.
Figure 14:
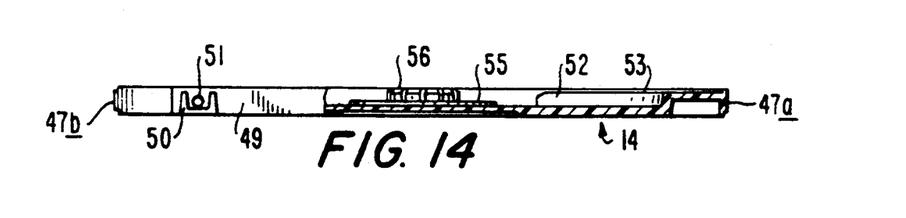
FIG. 14 is an end elevational view, partly in section along the line 14—14 on FIG. 13, of the tray shown on FIG. 13.

Referring now to FIGS. 13 and 14, it will be seen that the tray 14 is generally rectangular to fit within the lid member 12 between the peripheral walls 25 and 26. More particularly, the tray 14 is molded to include a base 47 with relatively low upstanding flanges 48 and 49 extending along the opposed relatively short sides, respectively, of the base 47. The flanges 48 and 49 are formed, near their ends, with relieved resilient tabs 50 having pins 51 projecting outwardly therefrom (FIG. 14). The pins 51 are located so that, when the tray 14 is inserted between the peripheral walls 25 and 26 of the lid member 12 and seated on the tabs 29, the pins 51 are resiliently engageable in the holes 30 of the peripheral walls 25 and 26 for securing the tray 14 on the lid member 12. The base 47 of the tray 14 is further shown to have raised portions 52 encircling a circular indentation 53 which is similar to the previously described indentation 42, and which is also dimensioned to loosely receive a respective compact disc. It will be seen on FIG. 13 that the circular indentation 53 is substantially closer to the flange 49 than to the opposed flange 48 so that there is a substantial flat area 54 of the base 47 between the indentation 53 and the flange 48. For removably supporting a compact disc on the tray 14, the base 47 has an annular elevated seat 55 at the center of the respective indentation 53 for engagement with an information-free central area of a compact disc disposed in the circular indentation 53. A circular array of resilient segmented parts extend from within the elevated seat 55 and form a spring catch 56 which is engageable in the usual center hole of the compact disc disposed on the seat 55 for retaining such compact disc on the seat. Once again, the raised portions 52 of the base 47 are interrupted at diametrically opposed regions of the perimeter of the indentation 53, as at 52a and 52b on FIG. 13, so as to facilitate manual gripping of the edge of a compact disc when engaging or disengaging the spring catch 56 with respect to the compact disc.

The lateral dimension $D_3$ of the base 47, at the portion thereof formed with the raised portions 52 for defining the circular indentation 53, is approximately equal to the lateral dimension $D_2$ (FIG. 9) of the panel 24 of lid member 12. One long side 47a of the base 47 is substantially straight, while the opposite long side has a laterally projecting intermediate edge portion 47b approximately coextensive with the indentation 53 and disposed between cutout end edge portions 47c and 47d which extend to the flanges 48 and 49, respectively. Finally, the midportion of the long side 47a of the base 47 and the opposite intermediate edge portion 47b of the base 47 are shown to have cutouts 57a and 57b, respectively, extending into the adjacent raised portions 52. When the tray 14 is assembled with the lid member 12, the cutouts 57a and 57b are adjacent the opposed long sides of the panel 24 of the lid member and are substantially spaced from the relatively short sides of the panel 24 so that the cutouts 57a and 57b will be located for receiving the tapered protuberances 46a and 46b, respectively, of the tray 13 when the storage case 10 is in its closed condition, as hereinafter described in detail.

In assembling the bottom and lid members 11 and 12 and the trays 13 and 14 so as to form the storage case 10, a suitably prescored and preprinted sheet 58 may be initially placed within the bottom member 11 (FIG. 6) so as to line the transparent panel 15 and peripheral walls 16 and 17, whereupon the tray 13 is placed within the bottom member 11 and has its pins 40 resiliently engaged in the respective holes 22 in the rims 18 and 19 of the bottom member 11. When the tray 13 is thereby mounted on bottom member 11, the preprinted sheet 58 is visible through the transparent panel 15 and peripheral walls 16 and 17 of the bottom member. Then, the tray 14 is assembled in the lid member 12 with the straight relatively long side 47a of the tray being generally aligned with the long side 24a of the panel 24 of the lid member for providing a compartment 58 therebetween. Upon the resilient engagement of the pins 51 of the tray 14 in the respective holes 30 in the peripheral walls 25 and 26 of the lid member 12, the opposite end portions of the base 47 are seated securely on the tabs 29 so as to suitably space the base 47 of the tray 14 from the panel 24 of the lid member for providing a compartment 58 therebetween.

After the trays 13 and 14 have been mounted on the bottom and lid members 11 and 12, respectively, the pins 27 directed inwardly from end portions 25a and 26a of the peripheral walls 25 and 26, respectively, of the lid member 12 are engaged in the relatively deep portions of the grooves 21 at the upper or lower edges of the respective end portions 18a and 19a of the rims 18 and 19 of the bottom member 11. Then, the pins 27 are moved along the respective grooves 21 which decrease in depth to the holes 20 where, in response to the flexing of the end portions 25a and 26a of the peripheral walls 25 and 26, the pins 27 are snapped into the respective holes 20 for pivotally connecting the bottom and lid members 11 and 12. The pivotally connected bottom and lid members 11 and 12 are movable relative to each other about an axis which is defined by the pins 27 and which is parallel to adjacent long sides of the panels 15 and 24. The bottom and lid members 11 and 12 are thus pivotable relative to each other between a closed position (FIGS. 2 and 6) in which the panels 15 and 24 are in parallel spaced relation while the peripheral walls 16 and 17 and the peripheral walls 25 and 26 interfit to enclose a space between the panels, and an opened position (FIG. 1) in which the panels 15 and 24 of the bottom member 11 and the lid member 12 are angularly spread apart. In such opened position of the bottom member 11 and lid member 12, compact discs CD1 and CD2 can be readily engaged with the spring catches 45 and 56 and thereby held in engagement with the annular seats 44 and 55, respectively, within the circular indentations 42 and 53. The annular elevated seats 44 and 55 engage only information-free central areas of the respective compact discs which are otherwise held out of contact with the bottom surfaces of the respective indentations 42 and 53. Further, the raised portions 41 and 52 encircling the indentations 42 and 53 are deep enough to extend beyond the outer faces of the compact discs CD1 and CD2 supported on the annular seats 44 and 55.

With the bottom member 11 and lid member 12 in their spread open position, access is also readily had to the compartment 58 between the outer ends of the peripheral walls 25 and 26 of the lid member 12. Thus, a relatively thick printed booklet or pamphlet B, for example, containing information concerning the recorded contents of the compact discs CD1 and CD2, may be slidably inserted into the compartment 58 between the outer ends of the peripheral walls 25 and 26. During the insertion of the relatively thick booklet or pamphlet B between the base 47 of tray 14 and the panel 24 of lid member 12, the pamphlet or booklet B slides over the sloping or curving portions of the projections 32 spaced apart along the side 24b of the panel 24. When the booklet or pamphlet B is fully inserted within the compartment 58, the innermost edge portion of the booklet or pamphlet engages the abutment 31 extending along the side 24a of the panel 24 to prevent further inward movement of the booklet or pamphlet. At such time, the outer edge portion of the pamphlet or booklet B moves off the projections 32 so that the shoulders 32a of the projections then confront the outer edge of the booklet or pamphlet to prevent inadvertent sliding of the booklet or pamphlet out of the compartment 58. Since the circular indentations 42 and 53 provided in the trays 13 and 14 for receiving the compact discs CD1 and CD2 are not equidistant between the rims 18 and 19 of the bottom member 11 or the peripheral walls 25 and 26 of the lid member 12, relatively large flat areas 43 and 54 are provided within the trays 13 and 14 for receiving additional printed material (not shown).

Figure 2:
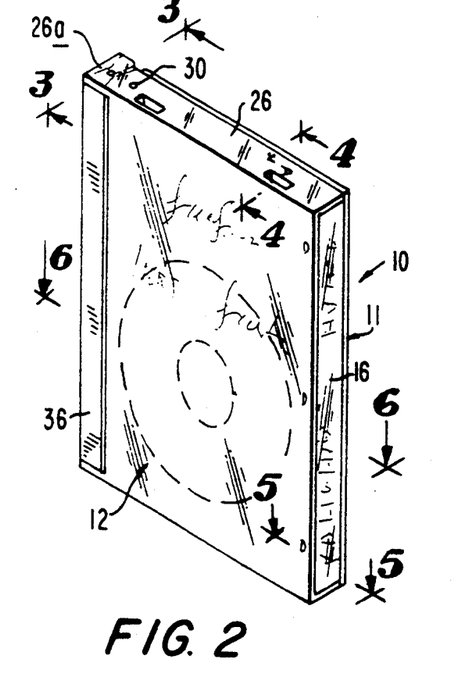
FIG. 2 is a perspective view of the storage case of FIG. 1, but shown on a smaller scale and in its closed position.
Figure 6:
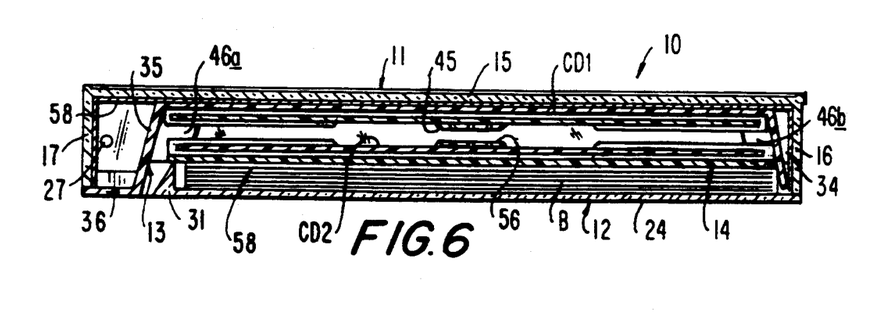
FIG. 6 is a transverse sectional view taken along the line 6—6 on FIG. 2 and showing the compact discs and printed pamphlet or booklet contained within the storage case in its closed position.

With the compact discs CD1 and CD2 positioned in the indentations 42 and 53, respectively, and with the relatively thick printed booklet or pamphlet B disposed within the compartment 58, the bottom member 11 and lid member 12 may be angularly displaced relative to each other to the closed position of FIGS. 2 and 6 in which the rounded pins or protuberances 28 on the peripheral walls 25 and 26 of the lid member 12 snap into the holes 23 in the rims 18 and 19 of the bottom member for yieldably retaining the members 11 and 12 in the closed position. In such closed position, the tapered protuberances 46a and 46b arising from raised portions 41 and merging with the adjacent peripheral walls 35 and 34 of the tray 13 extend closely into and are received by the cutouts 57a and 57b in the tray 14 of the lid member 12. Thus, in the closed position of the bottom member 11 and lid member 12, the respective trays 13 and 14 are precisely positioned relative to each other for avoiding any contact between the compact discs CD1 and CD2 which face each other in the closed storage case 10. Furthermore, the protrusions 46a and 46b, in extending into the cutouts 57a and 57b, come into bearing support or contact with the relatively thick and hence heavy, booklet or pamphlet B disposed in the compartment 58 between the tray 14 and the panel 24 of the lid member. Therefore, the booklet or pamphlet B cannot disturb or damage either of the compact discs CD1 and CD2 even if the case 10 is subjected to a heavy or forceful impact. Moreover, by reason of the contact of the protrusions 46a and 46b with the booklet or pamphlet B in the compartment 58, inward bowing of the panel 24 of lid member 12, that is, flexing of panel 24 toward panel 15 of the bottom member 11, is deterred. As a result of the foregoing, inward pressing of the panel 24 at its midportion between the peripheral walls 25 and 26 will not cause such peripheral walls to flare and to thereby disengage pivot pins 27 from holes 20.

When the storage case 10 is closed, printed promotional material on a cover of the booklet or pamphlet B in the compartment 58 is clearly visible through the transparent panel 24 of the lid member 12.

Figure 1:
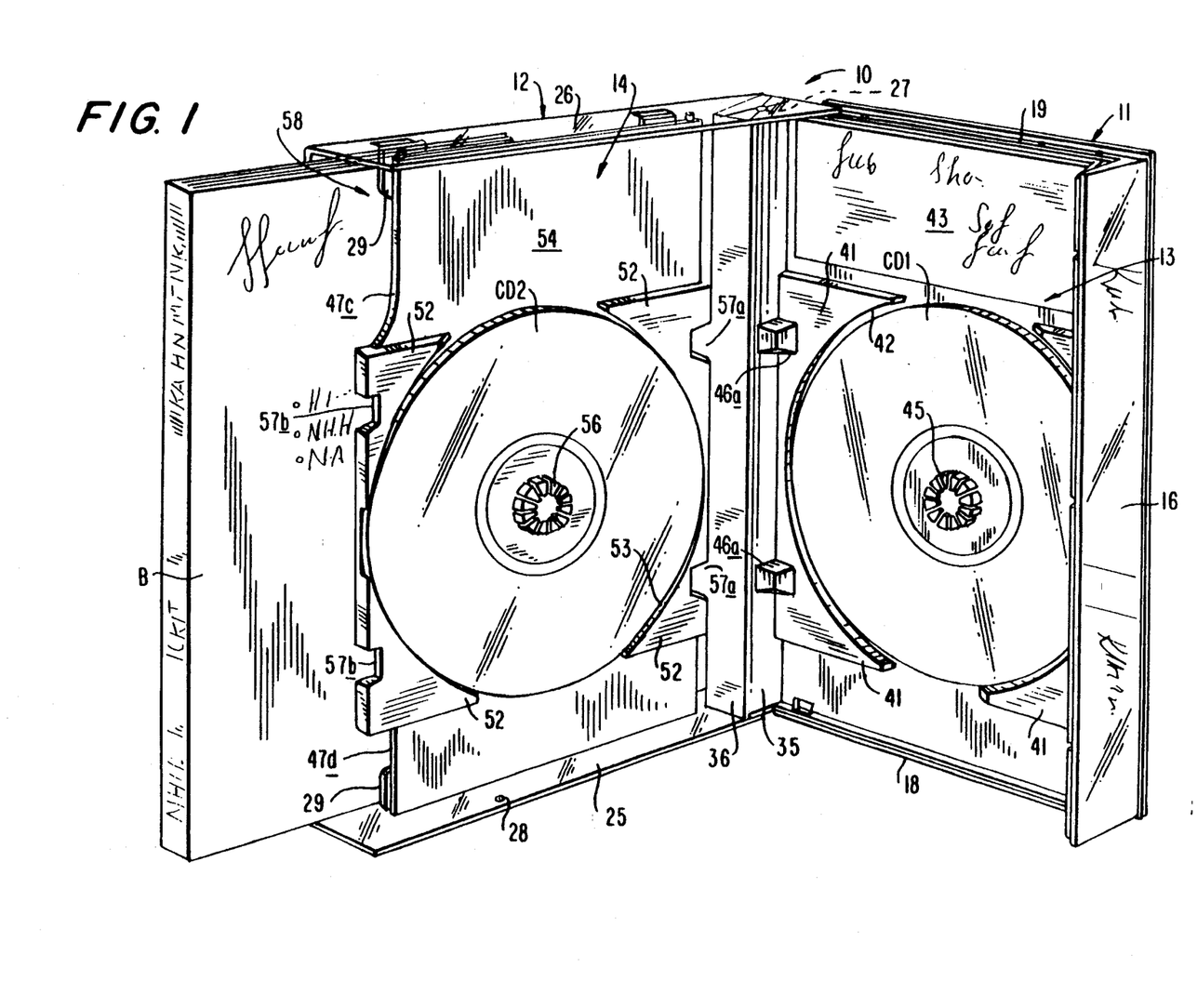
FIG. 1 is a perspective view of a storage case in accordance with an embodiment of this invention, and which is shown in its opened position with two compact discs disposed on respective holders of the storage case, and with a printed pamphlet or booklet partially inserted in a compartment therefor.

When it is desired to open the storage case 10, it is only necessary to lift the lid member 12, at the center of its edge or side 24b, relative to the bottom member 11 so as to disengage the rounded pins 28 from the holes 23, whereupon the lid member 12 and bottom member 11 can be spread wide, as shown on FIG. 1. Then, a selected one of the compact discs CD1 and CD2 can be readily removed from its-respective spring catch 45 or 56 without disturbing the other of the compact discs. Such removal of a desired one of the compact discs from its respective circular indentation 42 or 53 is facilitated by the interruptions 41a and 41b and the interruptions 52a and 52b provided in the raised portions 41 and 52, respectively, and through which the periphery of the compact disc CD1 or CD2 can be readily grasped. It will also be seen that, with the storage case 10 in its opened position, the outer edge portion of the booklet or pamphlet B within the compartment 58 can be grasped through the cutout end edge portions 47c and 47d (FIG. 1) of the tray 14, whereupon the outer edge portion of the booklet or pamphlet B can be raised slightly over the projections 32 so as to permit manual withdrawal of the booklet or pamphlet from the compartment 58.

Although a preferred embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A storage case for accommodating a plurality of compact discs comprising:

a bottom member including a panel of rectangular configuration, and a pair of opposed peripheral walls extending along relatively long sides of said panel;

a lid member including a panel of substantially the same rectangular configuration as said panel of the bottom member, and a pair of opposed peripheral walls extending along relatively short sides of said panel of the lid member;

means pivotally connecting said lid and bottom members for movements relative to each other about an axis parallel to adjacent long sides of said panels of the lid and bottom members, respectively, between a closed position in which said panels are in parallel spaced relation with said peripheral walls of the lid member extending between adjacent ends of said peripheral walls of the bottom member for enclosing a space between said panels, and an opened position in which said panels of the lid and bottom members are angularly spread apart;

first and second trays each having disc supporting means for removably supporting a respective compact disc thereon;

means for mounting said first and second trays on said lid and bottom members, respectively, so as to be disposed at interiors of said panels in said closed position with said disc supporting means of said first and second trays in confronting relation to each other, said means for mounting one of said trays including means for spacing said one tray from the panel of the respective one of said lid and bottom members and thereby defining a compartment for receiving a printed booklet and to which, in said opened position, access is had between ends of said peripheral walls of said one member;

said one tray having cutouts located adjacent both of the opposed long sides of said panel of the respective one of said lid and bottom members, said cutouts being substantially spaced from the relatively short sides of said panel of the respective one of the lid and bottom members; and the other of said trays having tapered protuberances located to extend into said cutouts and being dimensioned for bearing support against a printed booklet in said compartment when said lid and bottom members are in said closed position thereof, whereby to deter bowing toward each other of the panels of said lid and bottom members.

2. A storage case as in claim 1; in which said trays have raised portions encircling indentations dimensioned to receive the respective compact discs and confronting each other in said closed position of said lid and bottom members; and in which said protuberances and cutouts are located in said raised portions of the respective trays.

3. A storage case as in claim 1; in which said one tray is spaced from the panel of said lid member so that said compartment is defined in said lid member and access to said compartment is had between ends of said peripheral walls extending along short sides of said panel of the lid member.

4. A storage case as in claim 4; in which said bottom member further has relatively shallow rims extending along relatively short sides of the respective panel and having relatively deep end portions joined to adjacent ends of the peripheral wall of said bottom member which extends along the long side of the respective panel adjacent said axis; and said means pivotally connecting said lid and bottom members includes holes in said deep end portions of the rims, and pins directed inwardly from end portions of said peripheral walls of the lid member for engagement in said holes in the deep end portions of said rims so that the deterrence of said bowing of the panel of said lid member discourages inadvertent removal of said pins from said holes.

* * * * *